(No Model.)  3 Sheets—Sheet 1.

J. B. JARMIN.
CHECK ROW CORN PLANTER.

No. 493,362.  Patented Mar. 14, 1893.

Witnesses:
Wm E Poulter.
Annie A. Lansdale.

Inventor:
James B. Jarmin,
by his attorney
H. B. Willson (No Model.)  3 Sheets—Sheet 3.

J. B. JARMIN.
CHECK ROW CORN PLANTER.

No. 493,362.  Patented Mar. 14, 1893.

UNITED STATES PATENT OFFICE.

JAMES B. JARMIN, OF OSCEOLA, NEBRASKA.

CHECK-ROW CORN-PLANTER.

SPECIFICATION forming part of Letters Patent No. 493,362, dated March 14, 1893.

Application filed October 28, 1892. Serial No. 450,206. (No model.)

*To all whom it may concern:*

Be it known that I, JAMES B. JARMIN, a citizen of the United States, residing at Osceola, in the county of Polk and State of Nebraska, have invented certain new and useful Improvements in Check-Row Corn-Planters; and I do hereby declare the following to be a full, clear, and exact description of the invention, such as will enable others skilled in the art to which it appertains to make and use the same.

My invention has relation to check-row corn-planters and drills, and it has for its object to provide a simple and easily operated planter, which is adapted to act also as a drill, and the invention consists in the construction, arrangement and combination of parts, all as hereinafter fully described, illustrated in the accompanying drawings, and pointed out in the claims.

Figure 1:
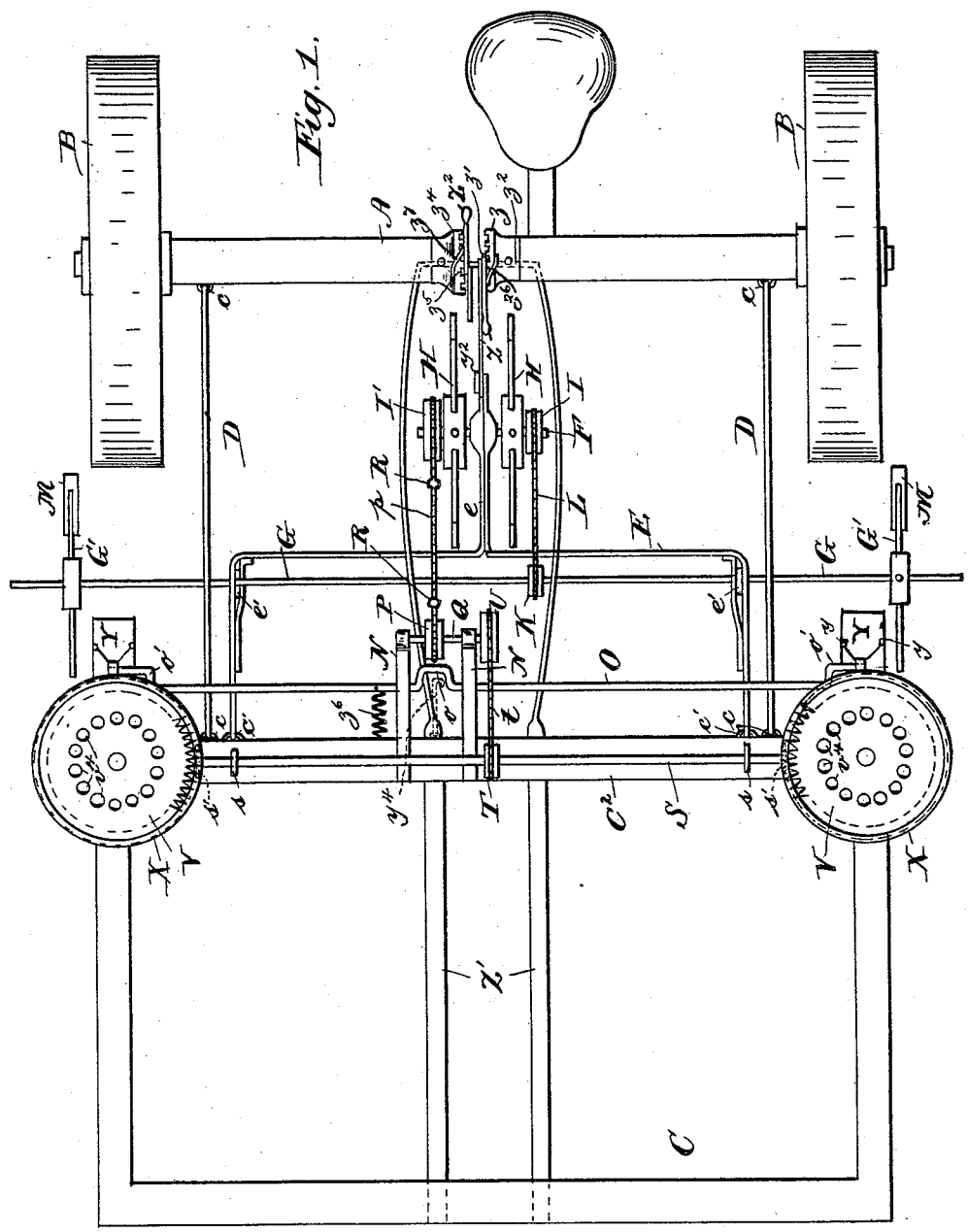
Figure 2:
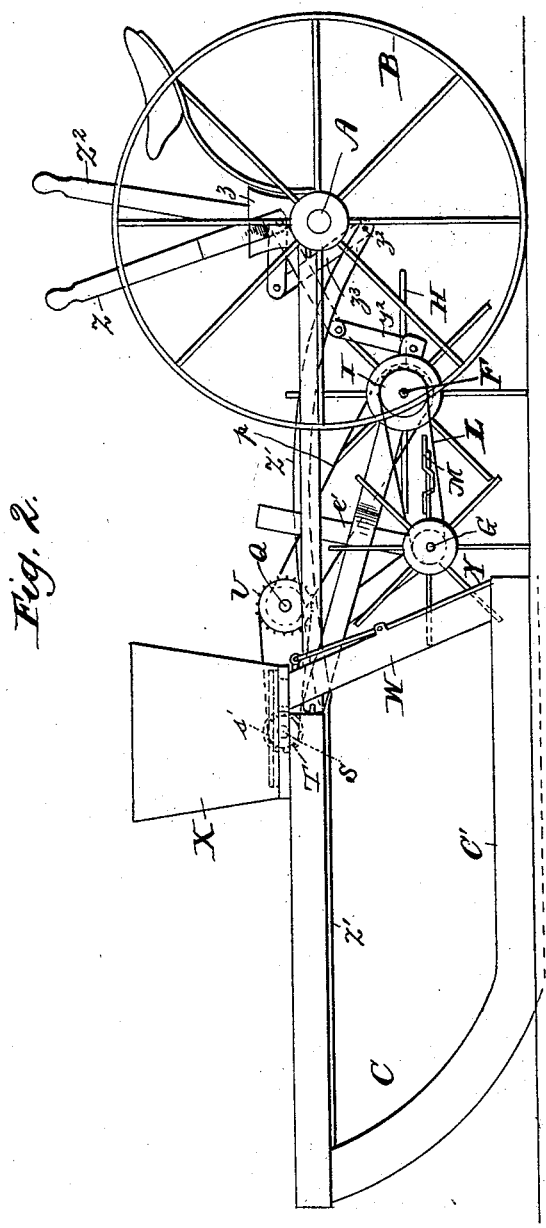
Figure 3:
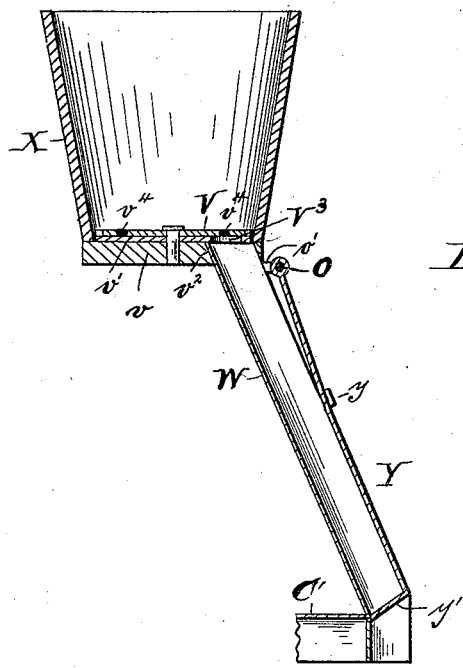

In the drawings:—Figure 1, is a plan view of my improved corn planter and drill. Fig. 2 is a side elevation thereof. Fig. 3 is a vertical section through the seed-box, plate, tube, and dropping valve.

A indicates the main axle of the planter provided with the ground or bearing-wheels B.

C indicates the usual sled or runner-frame provided with the runners C' located in line with the ground-wheels B, and adapted to perform the usual function of opening the furrows.

The axle A is pivotally connected with the frame C by means of the connecting bars or rods D, which have their ends loosely jointed or pivoted upon staples c, secured to the said axle and frame.

Pivoted to staples c' secured to the frame C is a frame E in the rearwardly-extending arm e, of which is mounted a short shaft F, and in the lower ends of the arms e' of said frame E is mounted a transverse shaft G.

Upon the shaft F are secured two spider or walking wheels H and sprocket wheels I, I', the sprocket wheel I being connected with a smaller sprocket wheel K mounted on the shaft G by means of a sprocket chain L. Upon the ends of said shaft G are secured small spider or walking wheels G' which are adapted to serve as marking wheels for the hills of corn, and for this purpose I secure upon one of the arms of each of said wheels a marking plate M which extends somewhat beyond the ends of said arms and is adapted to enter the ground alongside the hills.

Secured to the cross-beam $C^2$ of the frame C about midway of the length of said beam are the rearwardly-projecting arms N in which is mounted the transverse crank-shaft O, the crank o, whereof is located between said arms and adjacent to a sprocket wheel P mounted on a short shaft Q having bearings in the outer ends of the arms N. Said sprocket wheel P is connected with the sprocket wheel I' by means of a sprocket chain p, which is provided at intervals with spurs or enlargements R which are adapted to successively strike and partially turn the crank o. of shaft O.

Mounted in bearings s, secured to the cross-beam $C^2$ is a transverse shaft S which about midway of its length is provided with a sprocket wheel T which is connected by sprocket chain t, with a sprocket wheel U mounted upon the shaft Q.

Upon the shaft S at each end thereof is mounted a pinion s' which meshes with the teeth on the circumference of the seed-plates V which are revolubly mounted on the plates v, secured to the frame C, each of said plates being provided with slots $v^2$ in each of which is fitted the upper end of a seed tube W whose lower end is secured to or forms a part of the frame C. Between each seed disk and a bottom v, is secured a stationary plate v' provided with an opening $v^3$ above the upper end of the seed tube. Each of the seed disks is provided with the usual seed-openings $v^4$ which are adapted to successively pass over the opening $v^3$ in the plate v' and permit the corn to pass into the stationary tubes W. Secured to the frame C above the seed-plates are the seed boxes X.

The crank-shaft O is provided at each end with a crank o' to which is pivotally secured the upper end of the dropping valve Y which is pivoted at about its center to ears y, on the sides of the seed-tubes and the lower end of each of said valves Y is bent at a right angle or nearly so as shown at y' which portion closes the lower open end of the seed tubes W.

For the purpose of raising and lowering the spider or walking wheels I I' and marking wheels G', and thereby throw the dropping mechanism out of or into action, whenever this may be desirable, I pivotally secure to the rear end of the arm $e$, an arm $y^2$ to which is pivoted one arm of a bell-crank lever Z pivoted also to a bearing plate $z$, toothed at its upper end with the teeth of which is adapted to engage a spur $z'$ on the lever to hold the latter in whatever position it may have been adjusted, the engagement of the spur with the teeth being furthered by the flat spring $z^6$ secured at its upper end to the lever Z and its lower end binding against the plate $z$. By throwing the lever rearwardly the spider or rocking wheels and marking wheels will be lifted clear of the ground and held in that position, which is desirable when moving the planter from one field to another, or when turning at the end of a row.

For the purpose of raising and lowering the runner frame C out of contact with or into the ground, when desired, I secure centrally to said frame the longitudinal arms Z' whose rear ends are curved slightly downward and are connected by a cross bar $z^2$ to which is secured the lower end of an arm $z^3$ to the upper end of which is pivoted a bell-crank lever $Z^2$ which is also pivoted to a bearing plate $z^4$ secured to the axle A, and having teeth with which is adapted to engage a spur $z^5$ on the lever to hold the latter in its adjusted position, the engagement of the spur and teeth being furthered by a flat spring $z^7$ secured at its upper end to the lever $Z^2$ and its lower end binding against the plate $z^4$. By throwing the said lever $Z^2$ forwardly, the frame C will be raised from the ground, and by reversing the throw of said lever said frame will be lowered into the ground.

The operation of my improved planter may be briefly described as follows:—The machine having been placed in position at the point where it is desired to begin planting, the same is drawn forward, and the spider or walking wheels and marking wheels having been previously lowered onto the ground, said walking wheels will be rotated, and by means of the gearing described the marking wheels and seed-disks will be rotated. The parts should be so constructed and arranged that the seed-disks will turn a distance of three of their openings to allow three grains of corn to fall into each seed tube W during the time that the marking wheels rotate once, and the pins or spurs on the sprocket chain should be located at such distance apart as to depress or partially turn the crank $o$, of crank-shaft O each time that the seed-plates have moved a distance of three openings and dropped the three grains of corn into the seed tubes. By this arrangement it will be seen that immediately after the grains of corn have dropped into the tubes W a pin or enlargement R strikes and partially turns the crank $o$, which by forcing inwardly the upper ends of the valves Y causes the lower ends thereof to be forced outwardly thus uncovering the lower ends of the seed tubes and allowing the corn to fall into the furrows. Simultaneously with the deposit of the corn, the marking plates on the marking wheels will mark the ground at the side of each hill, and as soon as the pin R clears the crank $o$, the shaft O will be turned back into its normal position which effects the closing of the lower ends of the seed tubes until the seed plates have again moved a distance of three openings when the described dropping and marking will be repeated. For effecting the return of the shaft O to its normal position, I may employ any suitable means, as for instance a coiled spring $z^8$.

Inasmuch as the diameter of the marking wheels is one-half that of the ground or bearing wheels B, and a hill of corn being dropped at each revolution of said marking wheels, it will be seen that two such hills are dropped at each revolution of said ground or bearing wheels.

If it be desired to convert the planter into a drill, the crank-shaft O is turned to bring the crank $o$, out of the path of the projections R, and secured in that position by any suitable means as for instance a hook, $y^4$, (shown in dotted lines Fig. 1,) thus keeping the lower ends of the plates Y raised to uncover the lower ends of the tubes W, so that a grain of corn is deposited at a time in the furrows.

My combined corn planter and drill will check the corn straight for any length of field and will work successfully over hilly or rough ground.

What I claim, and desire to secure by Letters Patent, is—

1. In a corn planter, the combination with the axle provided with ground or bearing wheels, of a runner frame connected with said axle, a revoluble seed-disk and a seed box mounted on said frame, a seed tube into which said seed disk is adapted to discharge, a frame secured to said runner-frame, spider or walking wheels mounted upon a shaft journaled in said former frame, a rocking shaft mounted in bearings on the runner frame, dropping valve pivotally connected to said rocking shaft and to the seed tube and closing the lower end of the latter, and gearing between the spider or walking wheel shaft and the rocking shaft and seed-disk for effecting the revolution of the same, in the manner and for the purpose specified.

2. In a corn planter, the combination with the axle provided with ground or bearing wheels, of a runner frame connected with said axle, a revoluble seed-disk and a seed box mounted on said frame, a seed tube into which said seed disk is adapted to discharge, a frame secured to said runner frame, spider or walking wheels mounted on a shaft journaled in said former frame, marking wheels also mounted on a shaft journaled in said frame, a rocking shaft mounted in bearings on the runner frame, a dropping valve pivotally connected to said rocking shaft and to the seed tube and closing the lower end of the latter, and gearing between the spider or walking wheel shaft, and the rocking shaft, seed disk and marking wheel-shaft for effecting the revolution of the same, in the manner and for the purpose specified.

3. In a corn planter the combination with the axle provided with ground or bearing wheels, of a runner frame connected with said axle, a revoluble seed disk and a seed box mounted on said frame, a seed tube into which said seed disk is adapted to discharge, a frame pivotally secured to said runner frame, spider or walking wheels mounted upon a shaft journaled in said former frame, a rocking shaft mounted in bearings on the runner frame, marking wheels mounted on a shaft journaled in said pivoted frame, a dropping valve pivotally connected to said rocking shaft and to the seed tube and closing the lower end of the latter, gearing between the spider wheel shaft and the rocking shaft and seed-disk for effecting the revolution of the same, and means for raising and lowering the spider wheels and marking wheels, for the purpose specified.

4. In a corn planter, the combination with the axle provided with ground or bearing wheels, of a runner frame connected with said axle, a revoluble seed-disk and a seed box mounted on said frame, a seed tube into which said seed disk is adapted to discharge, a frame secured to said runner frame, spider or walking wheels mounted upon a shaft journaled in said former frame, a rocking crank shaft mounted in bearings on the runner frame, a dropping valve pivotally connected to said rocking shaft and to the seed tube and closing the lower end of the latter, and gearing between the spider wheel shaft and the rocking shaft and seed disk consisting of sprocket wheel carried by the spider wheel shaft and a shaft Q on the runner frame, sprocket chain connecting the said sprocket wheels and provided with pins adapted to strike the crank on the crank shaft, a shaft rotatably mounted on the runner frame and provided with gear wheel engaging teeth on the seed disk, a sprocket wheel on said shaft, and a sprocket wheel on the shaft Q, and a sprocket chain connecting the said sprocket wheel all arranged for co-operation, substantially as described.

5. In a corn planter, the combination with the axle provided with ground or bearing wheels, of a runner frame connected with said axle, a revoluble seed disk, and a seed box mounted on said frame, a seed tube into which said seed disk is adapted to discharge, a frame secured to said runner frame, spider or walking wheels mounted on a shaft journaled in said former frame, a rocking crank shaft mounted in bearings on the runner frame, a dropping valve pivotally secured to said rocking shaft and to the seed tube and closing the lower end of the latter, and a marking wheel mounted upon a shaft journaled on the frame carried by the runner frame, and gearing between the spider wheel shaft and the rocking shaft, seed disk and marking wheel shaft consisting of sprocket wheels carried by the spider wheel shaft, and a shaft Q on the runner frame, a sprocket wheel on the marking wheel shaft, a sprocket chain between the said sprocket wheel and one of the sprocket wheels on the spider wheel shaft, a sprocket chain between the other sprocket wheel on the spider wheel shaft and a sprocket wheel on shaft Q, and provided with pins adapted to strike a crank on the rocking shaft, and a second shaft carried by the runner frame provided with gear wheel engaging teeth on the seed disk, a sprocket wheel on said shaft, and a sprocket chain connecting the same with a sprocket wheel on the shaft Q, all arranged and adapted for cooperation, substantially as described.

In testimony whereof I affix my signature in presence of two witnesses.

JAMES B. JARMIN.

Witnesses:
J. L. McKEEVER,
H. T. ARNOLD.